US012618966B2

(12) United States Patent
Gorentz et al.

(10) Patent No.: US 12,618,966 B2
(45) Date of Patent: May 5, 2026

---

(54) CLEARANCE ENVELOPE SCANNING SYSTEM

(71) Applicant: Universal City Studios LLC, Universal City, CA (US)

(72) Inventors: Lucas Gorentz, Orlando, FL (US); Michael Beatrice, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 403 days.

(21) Appl. No.: 18/082,402

(22) Filed: Dec. 15, 2022

(65) Prior Publication Data

US 2023/0280460 A1 Sep. 7, 2023

Related U.S. Application Data

(60) Provisional application No. 63/315,821, filed on Mar. 2, 2022.

(51) Int. Cl.
*G01S 13/89* (2006.01)
*A63G 31/00* (2006.01)

(52) U.S. Cl.
CPC .............. *G01S 13/89* (2013.01); *A63G 31/00* (2013.01)

(58) Field of Classification Search
CPC ................................. G01S 13/89; A63G 31/00
See application file for complete search history.

(56) References Cited

U.S. PATENT DOCUMENTS

| | | |
|---|---|---|
| 5,403,238 A | 4/1995 | Baxter et al. |
| 8,079,916 B2 | 12/2011 | Henry |

| | | |
|---|---|---|
| 9,180,801 B2 | 11/2015 | Kennedy et al. |
| 9,433,870 B2 | 9/2016 | Blum et al. |
| 9,632,671 B2 | 4/2017 | Albright |
| 9,764,245 B2 | 9/2017 | Weston et al. |
| 9,778,364 B2 | 10/2017 | Gruver et al. |
| 10,207,193 B2 | 2/2019 | Stenzler et al. |
| 10,729,985 B2 | 8/2020 | Stenzler et al. |
| 2009/0234666 A1 | 9/2009 | Crawford et al. |

(Continued)

FOREIGN PATENT DOCUMENTS

| | | |
|---|---|---|
| EP | 1428728 A2 | 6/2004 |
| EP | 2455250 A1 | 5/2012 |

OTHER PUBLICATIONS

Väisänen, Antti. "Design of roller coasters." (2018). (Year: 2018).*

(Continued)

*Primary Examiner* — Bernarr E Gregory
*Assistant Examiner* — Nazra Nur Waheed
(74) *Attorney, Agent, or Firm* — Fletcher Yoder P.C.

(57) ABSTRACT

A clearance envelope scanning system for an amusement park attraction includes a detection system configured to couple to a ride vehicle of the amusement park attraction. The detection system includes an emitter configured to output a wave within an environment of the amusement park attraction and a receiver configured to detect the wave reflected off of an object within the environment. The clearance envelope scanning system also includes a controller communicatively coupled to the detection system, where the controller is configured to analyze properties of the wave detected by the receiver and to determine whether the object is within a clearance envelope of the ride vehicle.

19 Claims, 5 Drawing Sheets

(56) References Cited

U.S. PATENT DOCUMENTS

| | | | |
|---|---|---|---|
| 2015/0055124 A1* | 2/2015 | Buhler ..................... | B61K 9/00 |
| | | | 356/72 |
| 2017/0066459 A1* | 3/2017 | Singh ..................... | H04N 23/90 |
| 2017/0169449 A1 | 6/2017 | Heaven et al. | |
| 2018/0104600 A1 | 4/2018 | Stenzler | |
| 2018/0341040 A1 | 11/2018 | Cortelyou et al. | |
| 2019/0260972 A1* | 8/2019 | Behety ................. | H04N 23/695 |
| 2019/0353767 A1 | 11/2019 | Eberspach et al. | |
| 2021/0157004 A1 | 5/2021 | Graham et al. | |

OTHER PUBLICATIONS

PCT/US2023/013984 International Search Report and Written Opinion mailed Jun. 2, 2023.

\* cited by examiner

CLEARANCE ENVELOPE SCANNING SYSTEM

CROSS REFERENCE TO RELATED APPLICATION

This application claims priority from and the benefit U.S. Provisional Application No. 63,315,821, entitled "CLEARANCE ENVELOPE SCANNING SYSTEM," filed Mar. 2, 2022, which is hereby incorporated by reference in its entirety for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be understood that these statements are to be read in this light and not as admissions of prior art.

An amusement or theme park generally includes a variety of entertainment systems or attractions that each provides a unique experience for guests of the amusement park. For example, the amusement park may include different attraction systems, such as a roller coaster, a drop tower, a log flume, and so forth. Some attraction systems may include an environment that may have several different features, such as scenic elements, animated figures, and special effects, which help immerse guests in the experience of the attraction system. However, installation and configuration of the features may be difficult. For example, it may be challenging to determine whether the features are positioned at desirable locations within the environment (e.g., relative to a path of travel of a ride vehicle) to provide a desirable effect or experience for the guests. Furthermore, as attraction systems become increasingly complex, coordination between various features of the attraction system are of increased importance. Therefore, improved techniques to assess or evaluate the environment of an attraction system are desirable to determine whether features of the attraction system are desirably implemented.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a clearance envelope scanning system for an amusement park attraction includes a detection system configured to couple to a ride vehicle of the amusement park attraction. The detection system includes an emitter configured to output a wave within an environment of the amusement park attraction and a receiver configured to detect the wave reflected off of an object within the environment. The clearance envelope scanning system also includes a controller communicatively coupled to the detection system, where the controller is configured to analyze properties of the wave detected by the receiver and to determine whether the object is within a clearance envelope of the ride vehicle.

In another embodiment, a controller for a clearance envelope validation system of an amusement park attraction includes a tangible, non-transitory, computer-readable medium having processor-executable instructions stored thereon that, when executed, are configured to cause processing circuitry to output a control signal to a detection system coupled to a ride vehicle to emit a wave within an environment of the amusement park attraction, receive an input from the detection system, where the input includes data representative of a reflected wave detected by the detection system within the environment, analyze properties of the reflected wave, and determine whether an object within the environment breaches a clearance envelope of the ride vehicle based on the properties of the reflected wave.

In a further embodiment, a clearance envelope scanning system for an amusement park attraction includes a detection system configured to removably mount to a ride vehicle configured to travel through an environment of the amusement park attraction along a ride vehicle path, where the detection system is configured to emit waves into the environment and outward relative to the ride vehicle and to detect the waves reflected off an object within the environment as the ride vehicle travels through the environment along the ride vehicle path. The clearance envelope scanning system also includes a controller communicatively coupled to the detection system, where the controller is configured to monitor a clearance envelope of the ride vehicle based on data representative of an expected configuration of the amusement park attraction and to determine whether the object extends within the clearance envelope of the ride vehicle based on properties of the waves reflected off the object and detected by the detection system.

BRIEF DESCRIPTION OF THE DRAWINGS

Various aspects of this disclosure may be better understood upon reading the following detailed description and upon reference to the drawings in which.

DETAILED DESCRIPTION

Figure 1:
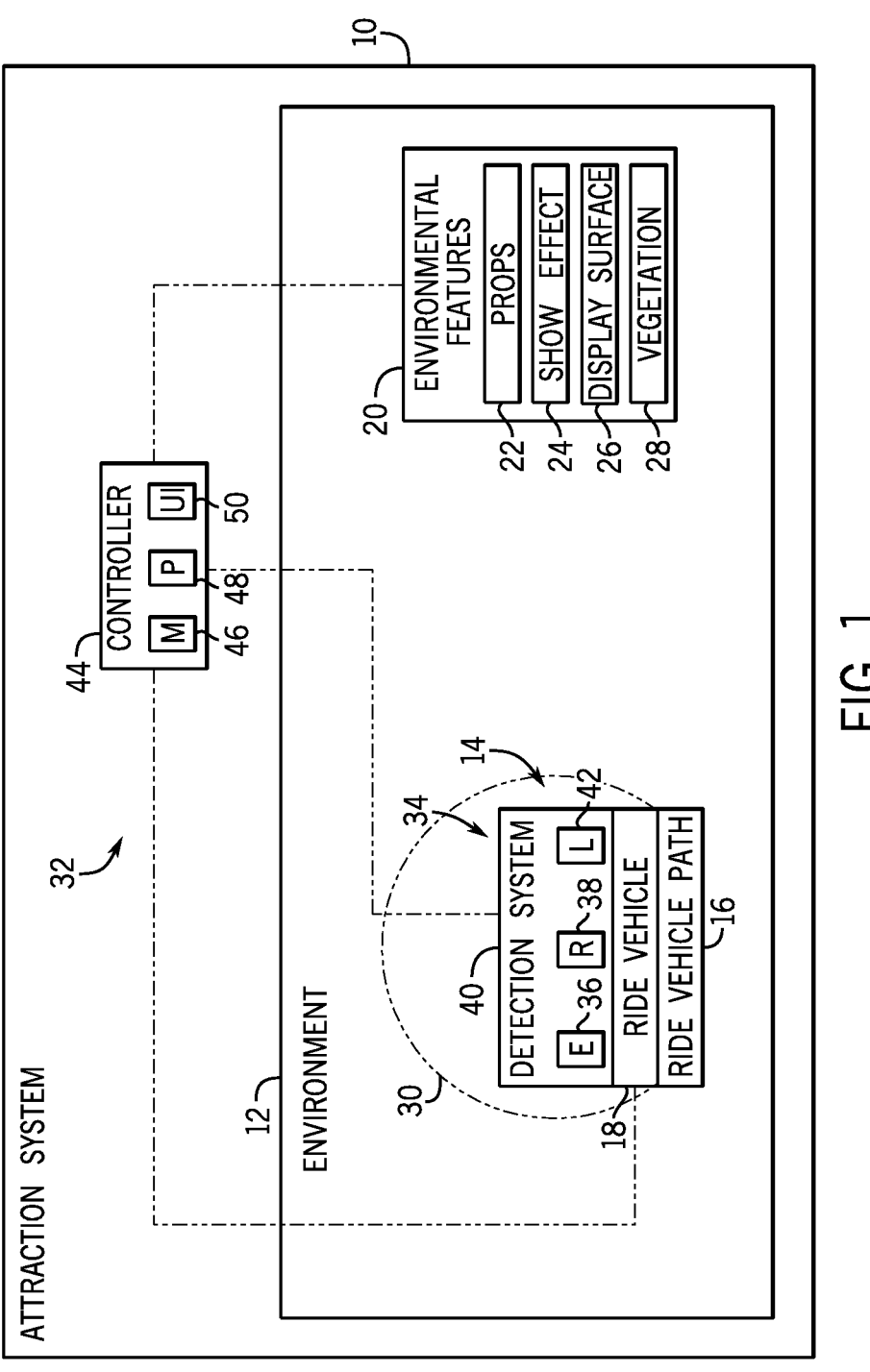
FIG. 1 is a schematic of an embodiment of an amusement park attraction system having an environment and a clearance envelope scanning system configured to scan the environment, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

Embodiments of the present disclosure are directed to a system and method for scanning a clearance envelope associated with an amusement park attraction system. For example, the attraction system may include any of various amusement rides, such as a roller coaster, a dark ride, a water ride, an augmented reality ride or experience, and the like. The attraction system may have various physical, environmental features, such as design props, set pieces, scenery elements, and so forth, for entertaining guests of the attraction system and providing a unique experience (e.g., an immersive environment) for the guests. Such features may be placed at target or predetermined locations within the environment of the attraction system. In some embodiments, the features may be at particular locations along a ride vehicle path to be viewed by the guests from a specific perspective as the guests travel along the ride vehicle path in a ride vehicle of the attraction system. In additional or alternative embodiments, the features may be positioned at certain locations to enable the features to interact with one another as intended. For example, a projector may be placed relative to a display screen to project an image onto the display screen.

It may be beneficial to scan the environment of the attraction system to identify the locations of the features (e.g., environmental features, physical features, physical objects) in order to verify that the features are properly positioned. For example, it is desirable to scan the environment of the attraction system to verify that the features are positioned at a proper location relative to a ride vehicle traveling along a ride vehicle path of the attraction system and confirm that the features do not breach a clearance envelope of the ride vehicle traveling along the ride vehicle path. The clearance envelope may be defined as a space or region surrounding or extending from the ride vehicle as the ride vehicle travels along the ride vehicle path. As discussed herein, scanning the environment includes determining whether physical objects of the environment extend into the defined clearance envelope of the ride vehicle traveling along the ride vehicle path. Thus, users (e.g., operators of the attraction system) may evaluate the environment and the attraction system to determine whether the physical features of the environment are placed at least a threshold distance away from the ride vehicle traveling through the environment. However, scanning the environment may be difficult or tedious. For instance, traditional systems utilized to detect objects extending into a clearance envelope of a ride vehicle system may be custom-built for a particular attraction system and/or ride vehicle and may be difficult or tedious to design, fabricate, operate, and/or store when not in use. Thus, verifying conformity with different clearance envelopes of multiple attraction systems may be cumbersome.

It is presently recognized that a system configured to scan an environment of an attraction system and verify compliance with a clearance envelope of a ride vehicle and/or ride vehicle path more readily may enable improved design, operation, and maintenance of attraction systems. In accordance with the techniques disclosed herein, a clearance envelope scanning system may include a controller and a detection system (e.g., sensing system) configured to define or establish a clearance envelope of a ride vehicle traveling along a ride vehicle path and to detect breaches of the clearance envelope as the ride vehicle travels along the ride vehicle path. Specifically, the clearance envelope scanning system is configured to detect physical objects (e.g., environmental features) that breach the established or defined clearance envelope of the ride vehicle as the ride vehicle travels along the ride vehicle path, such as during a maintenance, validation, inspection, or testing procedure. The detection system may include one or more emitters and/or receivers configured to establish (e.g., form, define, etc.) the clearance envelope and detect breaches of the clearance envelope by physical objects that may extend into the clearance envelope. For example, the emitters and/or receivers may include a light detection and ranging (LIDAR) device, an infrared 3D scanner, a structured light scanner, a laser transmitter and/or receiver, a digital photogrammetry scanner, a radio wave transmitter and/or receiver, another suitable transmission and detection system, another suitable device configured to emit and/or detect electromagnetic energy, or any combination thereof. The detection system may detect physical objects that extend into the clearance envelope, as well as qualities or characteristics of the physical objects, such as a position of the physical objects in the environment (e.g., relative to the ride vehicle), an amount (e.g., distance) by which the physical objects extend into the clearance envelope, a position of the physical objects along a ride vehicle path, or any other suitable characteristic of physical objects in the environment.

The controller of the clearance envelope scanning system may also be programmable to establish or define different clearance envelopes for multiple, different ride vehicle systems. For example, the controller may be programmed to generate or establish separate (e.g., unique) clearance envelopes for different ride vehicle systems, and the controller may operate the detection system according to a particular, selected clearance envelope. In some embodiments, the controller may generate or establish a clearance envelope based on a model or configuration of a particular ride vehicle system, attraction system, and/or environment, such as a computer aided design (CAD) drawing or model of an environment or attraction system. The controller may then generate a desired clearance envelope for the particular ride vehicle system, attraction system, and/or environment and detect breaches of the clearance envelope and/or verify compliance with the clearance envelope as the ride vehicle travels along the ride vehicle path through the environment. Indeed, in some embodiments, the clearance envelope scanning system may be a modular system that may be reprogrammed or reconfigured for different attraction systems having ride vehicle systems in different environments and may be separately used with each of the ride vehicle systems in the corresponding environment. For example, the modular clearance envelope scanning system may be removably mounted to different ride vehicle systems and may be operated to verify compliance with the individual or unique clearance envelope of each ride vehicle system as the ride vehicle travels through its corresponding environment. In this way, a single embodiment of the clearance envelope scanning system may be utilized with multiple different attraction systems and ride vehicle systems configured to operate in different environments instead of different, custom-built systems for each attraction system, ride vehicle system, and environment. Thus, present embodiments enable more efficient evaluation of clearance envelope compliance for multiple attraction systems.

Turning now to the drawings, FIG. 1 is a schematic of an embodiment of an amusement park attraction system 10 having an environment 12 and ride vehicle system 14 positioned within the environment 12. The ride vehicle system 14 includes a ride vehicle path 16 extending through the environment 12 and a ride vehicle 18 configured to travel through the environment 12 along the ride vehicle path 16. For example, the ride vehicle 18 may be configured to accommodate one or more guests (e.g., passengers) and direct the guests through the environment 12 along the ride vehicle path 16. As the guests travel in the ride vehicle 18 along the ride vehicle path 16, the guests may pass through, observe, or otherwise experience the environment 12 of the attraction system 10. For instance, in addition to the ride vehicle path 16, the environment 12 may include an enclosure, a stage, a room, a queue line, an outdoor environment, any other suitable type of setting, or any combination thereof.

The environment 12 may include various environmental features 20, such as props 22 (e.g., decorations, figures, scenic elements), show effects 24 (e.g., lighting, audio devices), display surfaces 26 (e.g., a projector screen for projection mapping), vegetation 28 (e.g., plants, trees), and/or other features (e.g., physical objects, structures, etc.). In some embodiments, one or more of the environmental features 20 may enhance an experience of the guests traveling within the ride vehicle 18 by, for example, inducing or generating sensory effects (e.g., sights, sounds, etc.) for the guests traveling through the environment 12. For example, the environmental features 20 may create a particular atmosphere or setting associated with the attraction system 10 experience (e.g., a jungle, a haunted house, outer space, etc.). In some embodiments, the environmental features 20 may be other physical objects, such as structural components, that support the various systems or features of the amusement park attraction system 10.

It is desirable to establish and maintain a clearance envelope 30 of the ride vehicle system 14 (e.g., the ride vehicle 18) as the ride vehicle 18 travels through the environment 12 along the ride vehicle path 16. The clearance envelope 30 may be a space, area, region, or zone surrounding and/or extending about the ride vehicle 18 that defines a desired clearance between the ride vehicle 18 and elements or objects in the environment 12 (e.g., environmental features 20) as the ride vehicle 18 travels along the ride vehicle path 16. That is, the clearance envelope 30 defines a clearance zone extending from the ride vehicle 18 within which physical elements disposed in the environment 12 are not to extend or interfere. The clearance envelope 30 may be established based on various parameters, such data related to a size or dimension of ride vehicle 18 passengers, data related to a size of the ride vehicle 18, data related to dimensions or configurations of the ride vehicle path 16, data related to operation of the ride vehicle system 14, and so forth. By establishing and maintaining the clearance envelope 30, inadvertent or undesired contact or interaction between physical objects in the environment 12 (e.g., environmental features 20) and the ride vehicle 18 and/or guests within the ride vehicle 18 may be avoided as the ride vehicle 18 travels through the environment 12.

Occasionally, the location or position of physical objects (e.g., environmental features 20) within the environment 12 may change. For example, vegetation 28 within the environment 12 may grow, which may alter a position or location of the vegetation 28 within the environment 12, such as relative to the ride vehicle path 16 and/or the ride vehicle 18 traveling through the environment 12. Accordingly, it is desirable to verify conformity with the clearance envelope 30 for the ride vehicle system 14, such as during installation of the amusement park attraction system 10, during periodic maintenance or inspection of the amusement park attraction system 10, at a particular scheduled or determined time interval, or other suitable time (e.g., a time during which the ride vehicle system 14 may be operated without guests in the ride vehicle 18). In other words, it is desirable to confirm that the clearance envelope 30 is maintained and that the clearance envelope 30 is not breached (e.g., by a physical object extending into the clearance envelope 30). Indeed, it may be desirable to repeatedly (e.g., two or more times) verify compliance of the environment 12 (e.g., environmental features 20) with the clearance envelope 30.

Accordingly, present embodiments include a clearance envelope scanning system 32 (e.g., an amusement park attraction scanning system, a clearance envelope validation system, etc.) configured to establish or generate the clearance envelope 30 and to detect breaches of the clearance envelope 30. More specifically, the clearance envelope scanning system 32 is configured to verify compliance with the clearance envelope 30 as the ride vehicle 18 travels along the ride vehicle path 16 through the environment 12. For example, the clearance envelope scanning system 32 may be configured to delineate the clearance envelope 30 of the ride vehicle system 14 and detect objects of the environment 12 that extend into (e.g., breach) the clearance envelope 30 as the ride vehicle 18 travels through the environment 12 along the ride vehicle path 16, such as during an installation, inspection, or maintenance procedure. To this end, the clearance envelope scanning system 32 may include a detection system 34 configured to establish (e.g., plot, outline, mark, delineate, determine, define, etc.) the clearance envelope 30 and detect breaches of the clearance envelope 30 (e.g., detect physical objects that extend into the clearance envelope 30). In some embodiments, the detection system 34 may be a modular system configured to removably couple to (e.g., removably mount to) the ride vehicle 18. Indeed, the detection system 34 may be removably coupled to the ride vehicle 18, such that the detection system 34 may be separately coupled to different ride vehicles 18 that operate in different environments 12 and/or with different ride vehicle paths 16. In this way, the clearance envelope scanning system 32 may be configured and operated to verify conformity with a different clearance envelope 30 for each of multiple ride vehicle systems 14 operating in different environments 12.

In the illustrated embodiment, the detection system 34 includes an emitter 36 and a receiver 38 disposed within a housing 40. As mentioned above, the housing 40 may be a modular component (e.g., enclosure) containing the emitter 36 and receiver 38 and may be coupled to the ride vehicle 18 during a clearance envelope scanning and validation procedure (e.g., during which the ride vehicle 18 is directed through the environment 12 along the ride vehicle path 16). However, in some embodiments, the emitter 36 and/or the receiver 38 may be disposed external to the housing 40. For example, the housing 40, which may contain other components of the detection system 34, may be coupled to a first portion of the ride vehicle 18, and the emitter 36 and/or the receiver 38 may be disposed at another portion of the ride vehicle 18. In other embodiments, the detection system 34 may be integrated with the ride vehicle 18. As discussed below, the detection system 34 may additionally or alternatively include other components, such as a power supply, communications circuitry, processing circuitry, a memory, a user interface, and so forth.

The emitter 36 is configured to output a signal or wave (e.g., light wave, acoustic wave, electromagnetic wave, etc.) to establish and define the clearance envelope 30. That is, the emitter 36 may output the signal or wave outwardly relative to the detection system 34 and/or relative to the ride vehicle 18. For example, the emitter 36 may be a radio wave transmitter, a laser transmitter, an infrared wave transmitter, an ultraviolet wave transmitter, or other suitable transmitter configured to output a signal or wave (e.g., electromagnetic energy). As the ride vehicle 18 travels through the environment 12, the signal or wave may reflect off physical objects within the environment 12 (e.g., environmental features 20), and the receiver 38 may receive or detect the reflected signal or wave. Based on the reflected waves, the detection system 34 (e.g., the clearance envelope scanning system 32) may determine whether any physical objects breach the clearance envelope 30. In some embodiments, the detection system 34 may determine a location or position of physical objects within the environment 12. For example, the receiver 38 (e.g., radio wave receiver, laser receiver, etc.) may receive reflected waves at various times, having various properties, and so forth, indicative of the position or location of the physical objects within the environment 12 and relative to the ride vehicle 18 and/or detection system 34. The detection system 34 may analyze the detected parameters of each reflected wave to determine the location and/or position of the physical objects within the environment 12. In some embodiments, the emitter 36 may continuously output transmitted signals or waves (e.g., with a pulsed laser light, a radio frequency transmitter, etc.), the receiver 38 may continuously receive reflected waves, and as a result, the detection system 34 may continuously evaluate compliance of the environment 12 (e.g., environmental features 20) with the clearance envelope 30 established for the ride vehicle system 14 (e.g., as the ride vehicle 18 travels along the ride vehicle path 16 through the environment 12).

In some embodiments, the detection system 34 may also include a location sensor 42, which may be disposed within the housing 40. The location sensor 42 may be configured to collect and/or transmit data indicative of a position of the detection system 34 (e.g., a coordinate position or location) within the environment 12 and/or along the ride vehicle path 16. Feedback indicative of the location of the detection system 34, and thus the ride vehicle 18, within the environment 12 may be utilized to further evaluate compliance with the clearance envelope 30. For example, location feedback may be utilized to determine a location along the ride vehicle path 16 at which a breach or violation of the clearance envelope 30 is detected to determine which of various environmental features 20 violates the clearance envelope 30. In some embodiments, the clearance envelope 30 established for the ride vehicle system 14 may be dynamic. In other words, a size, dimension, geometry, or other characteristic of the clearance envelope 30 may vary at different locations of the ride vehicle 18 along the ride vehicle path 16, and location feedback may be utilized to adjust operation of the detection system 34 to establish the clearance envelope 30 with different properties at different locations along the ride vehicle path 16. Additionally or alternatively, data received via the location sensor 42 may be utilized to evaluate or determine placement of the detection system 34 relative to the ride vehicle 18 (e.g., a mounting or installed position of the detection system 34 on the ride vehicle 18). Further, while the illustrated embodiment depicts one emitter 36, receiver 38, and location sensor 42 for clarity purposes, it should be appreciated that the detection system 34 may include any suitable number of emitters 36, receivers 38, and/or location sensors 42 to enable generation and monitoring of the clearance envelope 30. In some embodiments, the emitter 36 and receiver 38 may be a single, integrated, or combined component configured to output and receive waves or signals (e.g., a laser transmitter and receiver, a spinning transmitter and receiver, etc.).

The clearance envelope scanning system 32 also includes a controller 44 configured to be communicatively coupled to the detection system 34. The controller 44 may be a dedicated controller of the clearance envelope scanning system 32 or may be another controller of the attraction system 10, such as a controller configured to control operation of the ride vehicle 18, one or more environmental features 20, one or more additional components of the environment 12 and/or ride vehicle system 14, or any other suitable controller configured to perform additional functions or operations. The controller 44 may include a memory 46 and processing circuitry 48. The memory 46 may include volatile memory, such as random access memory (RAM), and/or non-volatile memory, such as read-only memory (ROM), optical drives, hard disc drives, solid-state drives, or any other non-transitory computer-readable medium that includes instructions stored thereon. The processing circuitry 48 may be configured to execute the instructions stored on the memory 46. For example, the processing circuitry 48 may include one or more application specific integrated circuits (ASICs), one or more field programmable gate arrays (FPGAs), one or more general purpose processors, or any combination thereof. The detection system 34 may be configured to transmit (e.g., wirelessly and/or via a hardwired connection) sensor feedback or data to the controller 44 indicative of scanning data of the environment 12 received via the receiver 38. In some embodiments, the controller 44 may evaluate the data to assess compliance with the clearance envelope 30. That is, the controller 44 may be configured to determine whether any physical objects breach the clearance envelope 30 based on the data received from the detection system 34.

In some embodiments, the controller 44 and/or the detection system 34 may be programmed (e.g., based on user input) to establish the clearance envelope 30 based on data associated with the ride vehicle system 14, the environment 12, and/or the attraction system 10. For example, the controller 44 may include a user interface 50 configured to enable input of data associated with the ride vehicle system 14, the environment 12, and/or the attraction system 10. The user interface 50 may include a touch screen, a button, a track pad, a switch, a monitor, a keyboard, a camera, another suitable component, or any combination thereof, which the user may utilize to perform a desired operation (e.g., configuration of the detection system 34 for use with a particular embodiment of the ride vehicle system 14 in a particular embodiment of the environment 12). In some embodiments, a user may interact with the user interface 50 to load a profile associated with the ride vehicle system 14, the environment 12, and/or the attraction system 10. For example, the profile may include a model file (e.g., computer aided design drawing file) associated with the ride vehicle system 14, the environment 12, and/or the attraction system 10 that defines or represents an expected configuration of the ride vehicle path 16, expected locations or positions of environmental features 20 of the environment 12, and/or the clearance envelope 30 established for the ride vehicle system 14. Additionally or alternatively, the user may interact with the user interface 50 to adjust operation of the ride vehicle 18 (e.g., along the ride vehicle path 16), to adjust operation of the detection system 34, to adjust operation of one or more environmental features 20 in the environment 12, and/or to adjust any other suitable operating parameter of the attraction system 10 and/or the clearance envelope scanning system 32. For example, the user interface 50 may enable user adjustment of the operation of the emitter 36 (e.g., parameters of the signals or waves output by the emitter 36), the receiver 38 (e.g., a sensitivity of the receiver 38), or both. In some embodiments, the user interface 50 may also be configured to display or otherwise output a notification to provide feedback to a user of the clearance envelope scanning system 32. For example, the user interface 50 may output (e.g., display) a notification indicative of whether a violation of the clearance envelope 30 is detected or not detected during and/or subsequent to a clearance envelope scanning procedure.

Figure 2:
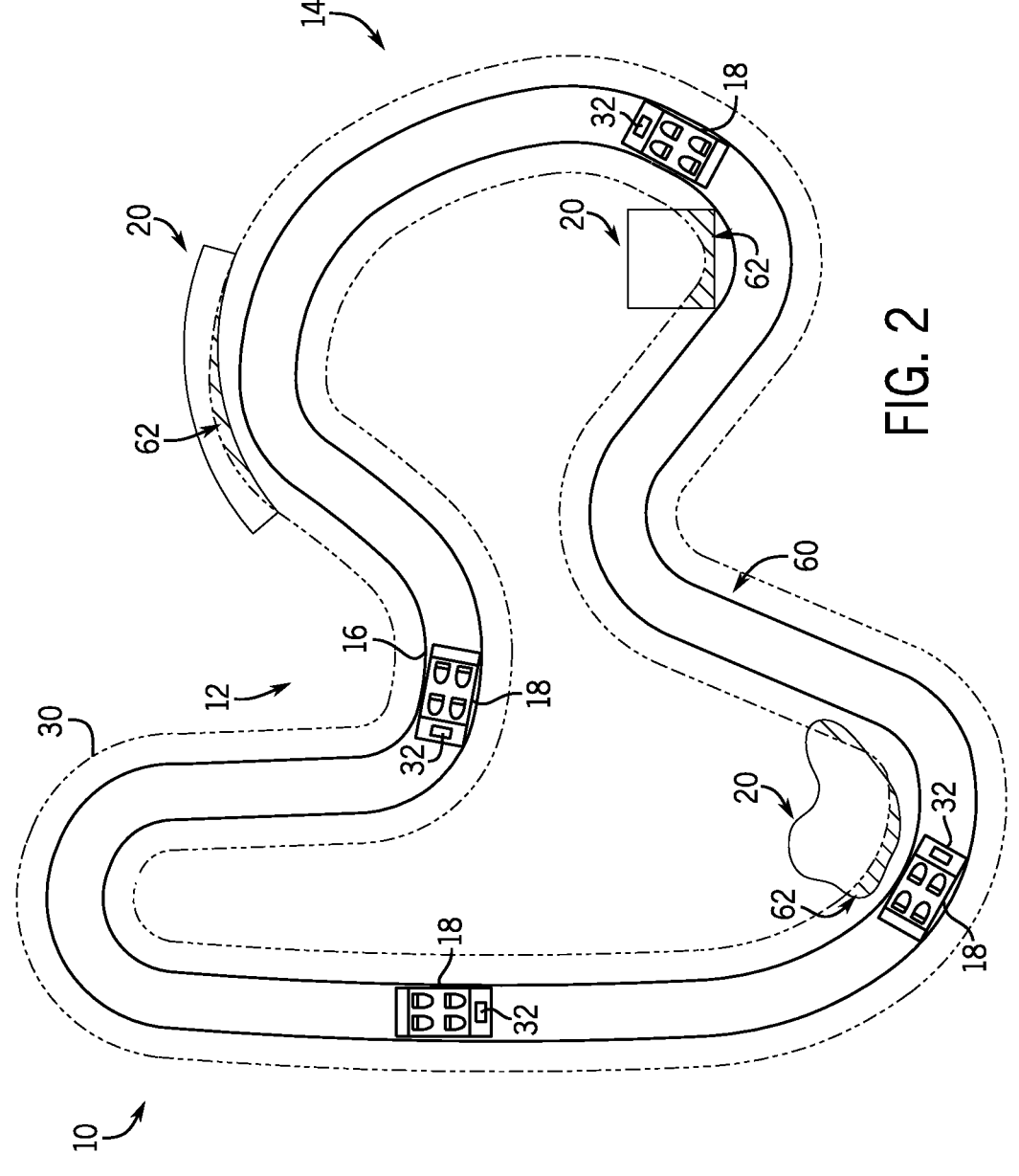
FIG. 2 is a plan view schematic of an embodiment of an environment of an amusement park attraction system and a ride vehicle with a clearance envelope scanning system traveling along a ride vehicle path, in accordance with an aspect of the present disclosure

FIG. 2 is a plan view schematic of an embodiment of the amusement park attraction system 10, illustrating the ride vehicle system 14 within the environment 12. As shown, the ride vehicle path 16 extends through the environment 12, and the ride vehicle 18 travels along the ride vehicle path 16. The environment 12 includes various environmental features 20 disposed therein and arranged along or adjacent the vehicle ride path 16. As mentioned above, the environmental features 20 may be designed to simulate a particular atmosphere and/or induce one or more sensory responses in guests traveling within the ride vehicle 18.

In accordance with the present techniques, the ride vehicle 18 includes the detection system 34 of the clearance envelope scanning system 32 coupled to the ride vehicle 18. For example, the detection system 34, which may include or otherwise be communicatively coupled to the emitter 36 and the receiver 38, may be mounted to a frame or body of the ride vehicle 18. The detection system 34 may be mounted to the ride vehicle 18 via a strap, a magnet, an adhesive, a fastener, or any other suitable technique. As the ride vehicle 18 travels along the ride vehicle path 16 (e.g., during a validation or testing procedure), the detection system 34 may establish and/or monitor the clearance envelope 30, which defines a region 60 extending from (e.g., surrounding) the detection system 34 and thus the ride vehicle 18. The detection system 34 is configured to detect physical objects that extend within the region 60 defined by the clearance envelope 30 by analyzing signals or waves output by the emitter 36 that are reflected off of the physical object and then detected by the receiver 38. For example, in the illustrated embodiment, the detection system 34 may detect portions 62 of the environmental features 20 that extend within the region 60 of the clearance envelope 30 as the ride vehicle 18 travels along the ride vehicle path 16. Based on the detection of the portions 62, the environmental features 20 may then be adjusted or modified by a user or operator, as desired, to ensure that the environmental features 20 do not extend within the clearance envelope 30 during normal operation of the ride vehicle system 14. Additional details of the clearance envelope scanning system 32 are discussed further below.

Figure 3:
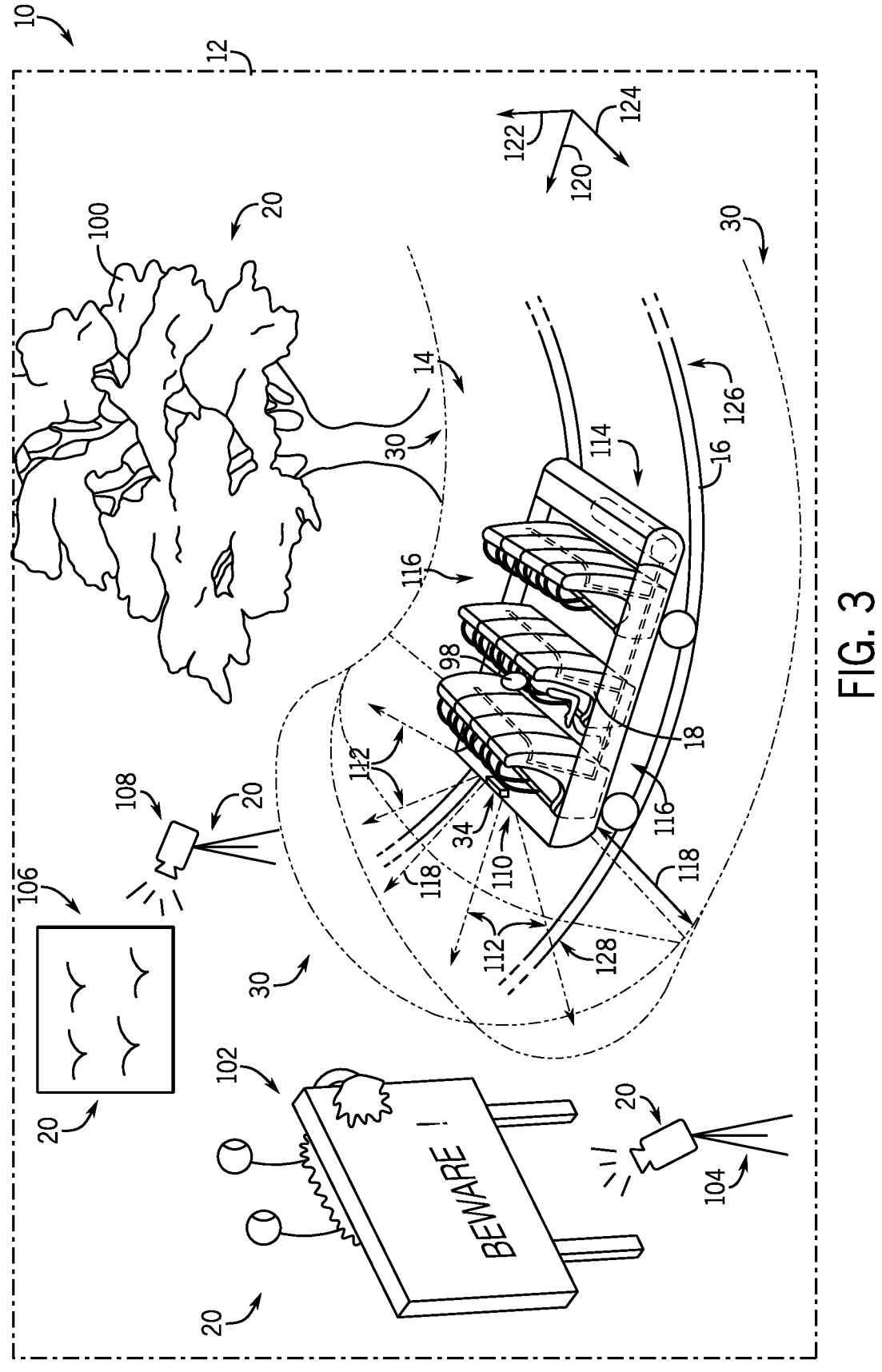
FIG. 3 is a perspective view of an embodiment of an environment of an amusement park attraction and a clearance envelope scanning system coupled to a ride vehicle, in accordance with an aspect of the present disclosure.

FIG. 3 is a perspective view of an embodiment of the amusement park attraction system 10, illustrating the ride vehicle system 14 extending through the environment 12. The ride vehicle 18 is shown traveling along the ride vehicle path 16 within the environment 12, which includes a variety of environmental features 20 disposed therein. For example, the environmental features 20 include a first environmental feature 100 (e.g., a tree, a prop, vegetation 28, etc.), a second environmental feature 102 (e.g., a display, an animatronic, a puppet, etc.), a third environmental feature 104 (e.g., a show effect, a lighting system, a projector, etc.), a fourth environmental feature 106 (e.g., a display surface, a screen, etc.), and a fifth environmental feature 108 (e.g., a show effect, a lighting system, a projector, etc.). As shown, the environmental features 20 are positioned within the environment 12 along and/or adjacent the ride vehicle path 16, such that the environmental features 20 may be visible or otherwise perceptible by a guest 98 traveling within the ride vehicle 18.

As discussed above, it is desirable to verify that the environmental features 20 positioned within the environment 12 are sufficiently spaced (e.g., at least a threshold distance away) from the ride vehicle 18 and/or the ride vehicle path 16 as the ride vehicle 18 travels along the ride vehicle path 16. In other words, it is desirable to verify that the environmental features 20 or a portion thereof do not breach the clearance envelope 30 established for the ride vehicle 18, the ride vehicle path 16, and/or the ride vehicle system 14. By verifying the inviolability of the clearance envelope 30, undesired contact between the ride vehicle 18 and the environmental features 20 may be avoided, mitigated, and/or substantially prevented. Similarly, by identifying any environmental features 20 and/or other physical elements that breach the clearance envelope 30, rectifying measures may be taken to ensure that such physical elements, objects, and/or features are adjusted, removed, modified, or otherwise addressed to ensure that the clearance envelope 30 is unviolated prior to operation of the ride vehicle system 14 (e.g., with guests 98 in the ride vehicle 18 during regular operation of the ride vehicle system 14). Accordingly, present embodiments include the clearance envelope scanning system 32 including the detection system 34 configured to scan the environment 12 and identify physical objects (e.g., a portion of one of the environmental features 20) extending into the clearance envelope 30.

In the illustrated embodiment, the detection system 34 is mounted to the ride vehicle 18 at a front portion 110 (e.g., a front surface, a top surface, a front end, etc.) of the ride vehicle 18. As discussed above, the detection system 34 may include the housing 40 containing the emitter 36 configured to output signals or waves and the receiver 38 configured to receive the signals or waves reflected off physical objects within the environment 12. The housing 40 may be coupled to the front portion 110 of the ride vehicle 18 to enable a generally unobstructed line of sight 112 from the detection system 34 to environmental features 20 adjacent to the ride vehicle 18 and/or otherwise within the environment 12. Thus, waves or signals emitted from the emitter 36 may reflect off environmental features 20 within the environment 12 and/or adjacent to the ride vehicle 18 and may be transmitted back to the detection system 34 for detection by the receiver 38. However, it should be appreciated that other embodiments of the detection system 34 and/or certain components of the detection system 34 (e.g., the emitter 36, the receiver 38) may be positioned at other portions of the ride vehicle 18. For example, the detection system 34 and/or components of the detection system 34 may be positioned at a rear portion 114 of the ride vehicle 18 and/or on a side portion (e.g., lateral side) 116 of the ride vehicle 18. Indeed, some embodiments of the clearance envelope scanning system 32 may incorporate multiple detection systems 34 or components (e.g., multiple housings 40, multiple emitters 36, and/or multiple receivers 38) coupled the ride vehicle 18 (e.g., at different locations or positions) to verify conformity of the environment 12 with the clearance envelope 30.

In operation, the detection system 34 generates and/or establishes (e.g., plots, outlines, marks, etc.) the clearance envelope 30 via the signals or waves emitted by the emitter 36 and monitors (e.g., verifies) the inviolability of the clearance envelope 30 based on evaluation of the waves or signals reflected off the environmental features 20 and received by the receiver 38. For example, based on a quality, characteristic, or parameter (e.g., wavelength, frequency, amplitude, etc.) of a wave or signal received by the receiver 38, the detection system 34 (e.g., clearance envelope scanning system 32) may determine a distance of a physical object relative to the detection system 34 and thus the ride vehicle 18. For example, based on a determination that a physical object is within a certain distance of the ride vehicle 18, the detection system 34 may determine that the physical object (e.g., a branch of the first environmental feature 100) is within the clearance envelope 30 associated with the ride vehicle 18, the ride vehicle path 16, and/or the ride vehicle system 14 generally. In other words, the clearance envelope 30 may be generally defined by one or more threshold distances 118 extending from the detection system 34 and/or the ride vehicle 18. Accordingly, one or more emitters 36 and/or receivers 38 is configured to detect the presence of an object within one or more of the threshold distances 118 in order to detect a violation of the clearance envelope 30. For example, based on a wave or signal emitted by the emitter 36 and detected by the receiver 38 (e.g., after reflecting off an object within one of the threshold distances 118), the detection system 34 may determine that an object violates the clearance envelope 30.

The threshold distances 118 defining the clearance envelope 30 may extend in any suitable direction relative to the ride vehicle 18 and/or the detection system 34. For example, the threshold distances 118 may extend along a longitudinal axis 120 (e.g., a direction of travel of the ride vehicle 18), a vertical axis 122, a lateral axis 124, or any combination thereof. Thus, the clearance envelope 30 may be defined to extend about and/or surround any suitable portion of the detection system 34 and/or the ride vehicle 18. The one or more threshold distances 118 defining the clearance envelope 30 may be selected based on any suitable parameters, variables, or inputs (e.g., user input), such as a size of the ride vehicle 18, an operating speed of the ride vehicle 18, a configuration of the ride vehicle path 16, a metric associated with passengers or guests 98 that may travel in the ride vehicle 18, a type of the environmental features 20, a position of the environmental features 20, and so forth. In some embodiments, the one or more threshold distances 118 may be determined based on user input indicative of a percentile metric associated with sizes or dimensions of a population of the guests 98 and a margin (e.g., measurement margin) added to the percentile metric. For example, one or more threshold distances 118 may be determined based on a percentile metric and/or margin related to a reach (e.g., arm reach) of guests 98 that are seated in the ride vehicle 18.

In some embodiments, dimensions of the clearance envelope 30 may vary along the ride vehicle path 16. For example, the detection system 34 may be configured to establish and monitor the clearance envelope 30 defined by a first set of threshold distances 118 at a first location 126 along the ride vehicle path 16 and establish and monitor the clearance envelope 30 defined by a second set of threshold distances 118 at a second location 128 along the ride vehicle path 16, where the first and second sets of threshold distances 118 differ from one another to establish different configurations or geometries of the clearance envelope 30 at different locations of the ride vehicle 18 along the ride vehicle path 16. The detection system 34 may be configured to establish and monitor the clearance envelope 30 having the desired geometry or configuration associated with a particular portion of the ride vehicle path 16 based on data (e.g., location or position data) received via the location sensor 42 of the detection system 34 or received via another input (e.g., a position or tracking system of the ride vehicle system 14). However, in other embodiments, the detection system 34 may establish the clearance envelope 30 with a uniform geometry or configuration (e.g., a set of constant or fixed threshold distances 118 for a portion of the ride vehicle system 14 or all of the ride vehicle system 14).

As discussed above, parameters of the clearance envelope 30 may be based on any suitable input, such as a computer-aided design (CAD) drawing or model file of the ride vehicle system 14, the environment 12, and/or the attraction system 10 that may be programmed or uploaded into the clearance envelope scanning system 32 (e.g., the memory 46). As such, the clearance envelope scanning system 32 (e.g., the detection system 34) may be programmed and repro-grammed for use with multiple different ride vehicle systems 14, environments 12, and attraction systems 10.

Figure 4:
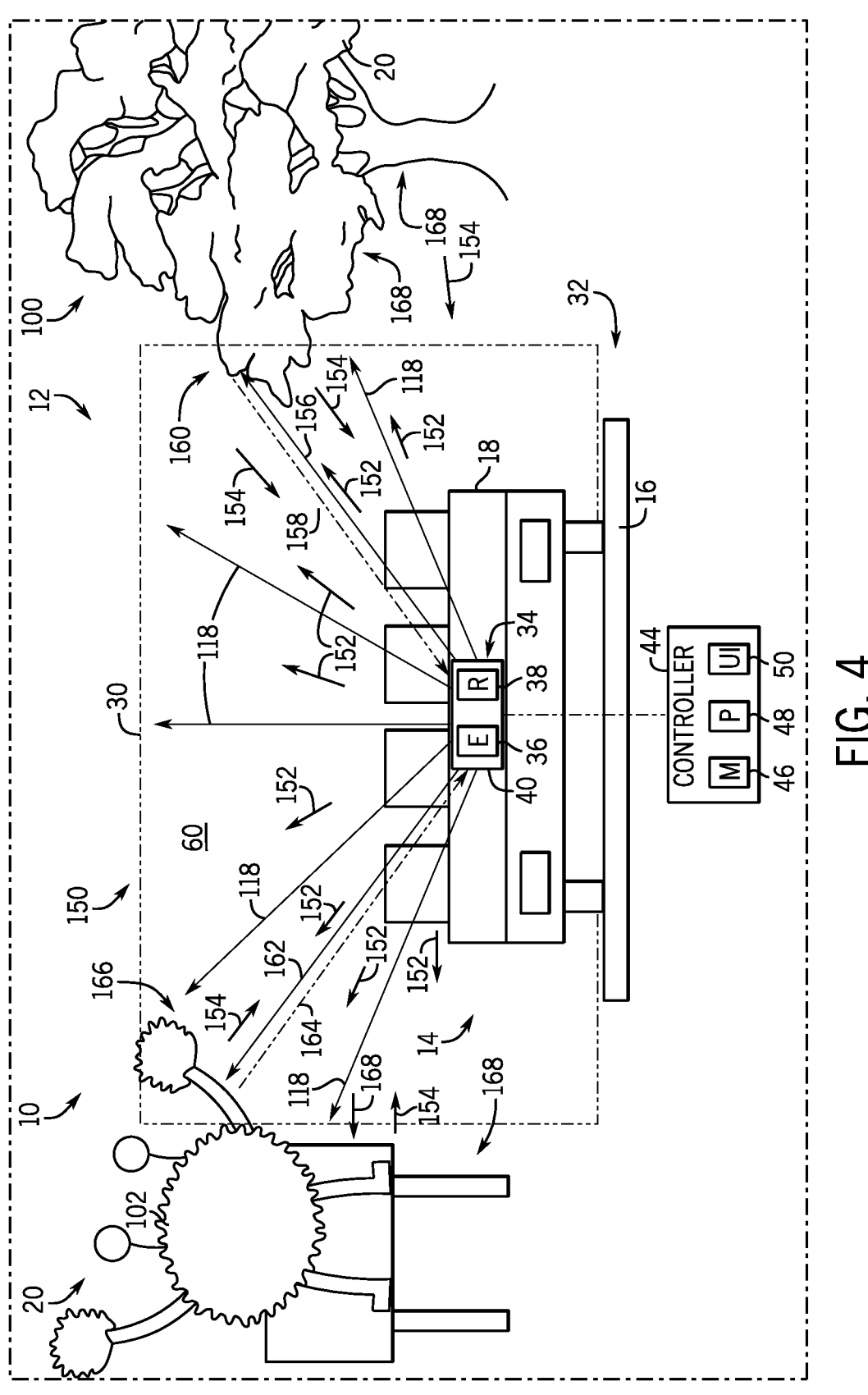
FIG. 4 is a schematic of an embodiment of an amusement park attraction illustrating an environment having multiple environmental features and a ride vehicle having a clearance envelope scanning system within the environment, in accordance with an aspect of the present disclosure.

FIG. 4 is a schematic of an embodiment of the amusement park attraction system 10, illustrating the ride vehicle system 14 positioned within the environment 12 and the detection system 34 generating and monitoring the clearance envelope 30 to detect breaches of the clearance envelope 30. As discussed above, the clearance envelope 30 may be defined by multiple threshold distances 118 extending from the detection system 34 and/or the ride vehicle 18. The emitter 36 may output a wave or signal, and the receiver 38 may detect the wave or signal reflected off a physical object (e.g., one of the environmental features 20) to determine whether the physical object is within one of the threshold distances 118 in accordance with the techniques described above. The multiple threshold distances 118 defining the clearance envelope 30 may vary in length or magnitude relative to one another. In some embodiments, the multiple threshold distances 118 may define the clearance envelope 30 having a substantially uniform shape or configuration (e.g., a substantially constant size or geometry of the region 60) as the ride vehicle 18 travels along the ride vehicle path 16. In other embodiments, the detection system 34 may establish the clearance envelope 30 based on variable threshold distances 118, such that the geometry, size, or configuration of the clearance envelope 30 varies as the ride vehicle 18 travels along the ride vehicle path 16 (e.g., based on a location of the ride vehicle 18 and the detection system 34 along the ride vehicle path 16). In any case, the magnitude of each threshold distance 118 may be selected based on one or more parameters, such as a desired clearance distance from the ride vehicle 18, an expected location of one of the environmental features 20, a direction that the threshold distance 118 extends from the ride vehicle 18, or other suitable factor. Based on a detection (e.g., via operation of the emitter 36 and receiver 38) that one of the environmental features 20 is positioned within one or more of the threshold distances 118, the clearance envelope scanning system 32 may determine that the clearance envelope 30 is breached.

The multiple threshold distances 118 generally define an outer perimeter 150 of the clearance envelope 30. As will be appreciated, any suitable number of threshold distances 118 may be utilized to define the outer perimeter 150 of the clearance envelope 30. That is, the detection system 34 (e.g., one or more emitters 36) may output waves or signals in any suitable number of directions, and the detection system (e.g., one or more receivers 38) may monitor and detect waves or signals that return to the detection system 34, such as after the waves or signals reflect off an object within the environment 12. Indeed, a wave or signal output by the emitter 36 may reflect off a physical object (e.g., one or more of the environmental features 20) and be subsequently detected by the receiver 38 to indicate the presence and location of the physical object. Based on the detection of the reflected wave or signal, the detection system 34 may determine whether a physical object extends within or traverses one or more of the threshold distances 118 and into the region 60 of the clearance envelope 30. For example, the detection system 34 may determine whether a physical object traverses one or more of the threshold distances 118 and extends into the clearance envelope 30 based on characteristics (e.g., wavelength, amplitude, frequency, etc.) of the wave or signal detected by the receiver 38.

The embodiment of FIG. 4 shows the detection system 34 establishing the clearance envelope 30 at a particular location along the ride vehicle path 16 within the environment 12 having two environmental features 20 (e.g., the first environmental feature 100 and the second environmental feature 102) in the vicinity. In the manner described above, the detection system 34 may determine whether any of the environmental features 20 violates the clearance envelope 30. The one or more emitters 36 of the detection system 34 output waves or signals 152 (e.g., outward relative to the detection system 34 and the ride vehicle 18). One or more of the waves or signals 152 (e.g., output waves, first waves, etc.) may reflect off one of the environmental features 20 and travel back toward the detection system 34 (e.g., as a reflected wave or signal 154). The one or more receivers 38 may detect the reflected waves or signals 154 (e.g., return waves, second waves, etc.) that are reflected back to the detection system 34. In some embodiments, the detection system 34 may analyze characteristics of the reflected waves or signals 154 to determine a position of the environmental feature 20 and determine whether the environmental feature 20 extends within the clearance envelope 30.

For example, a first output wave 156 output by the detection system 34 may contact and reflect off the first environmental feature 100. As a result, a first reflected wave 158 (e.g., a first return wave) may travel back toward the detection system 34 and may be detected by the receiver 38. In some embodiments, data indicative of the first reflected wave 158 may be transmitted to the controller 44 of the clearance envelope scanning system 32, and the controller 44 may analyze that representative of the first reflected wave 158 to determine a location of a portion 160 of the first environmental feature 100 that reflected the first output wave 156 to send the first reflected wave 158 back to the detection system 34. For example, the controller 44 may analyze properties of the first reflected wave 158 and determine that the portion 160 of the first environmental feature 100 extends within the region 60 and violates the clearance envelope 30. Similarly, a second output wave 162 output by the detection system 34 may contact and reflect off the second environmental feature 102 to send a second reflected wave 164 back to the detection system 34, and the controller 44 may determine that a portion 166 of the second environmental feature 102 violates the clearance envelope 30. Based on analysis of the first and second reflected waves 158 and 164, the controller 44 may also determine an amount by which the portions 160 and 166 of the environmental features 20 extend into the clearance envelope 30 (e.g., a distance that the portions 160 and 166 extend within the outer perimeter 150). As mentioned above, based on feedback from the location sensor 42, the controller 44 may also determine a location along the ride vehicle path 16 at which the clearance envelope 30 violation was detected to facilitate identification (e.g., visual identification) of the portions 160 and 166 of the environmental features 20 that violate the clearance envelope 30.

The present techniques may also be utilized to verify that portions of the environmental features 20 do not violate the clearance envelope 30. For example, output waves 152 output by the detection system 34 may contact and reflect off of portions 168 of the first environmental feature 100 and/or second environmental feature 102, and properties of corresponding reflected waves 154 detected by the detection system 34 may be analyzed to determine that the portions 168 of the first environmental feature 100 and/or second environmental feature 102 do not violate the clearance envelope 30.

Figure 5:
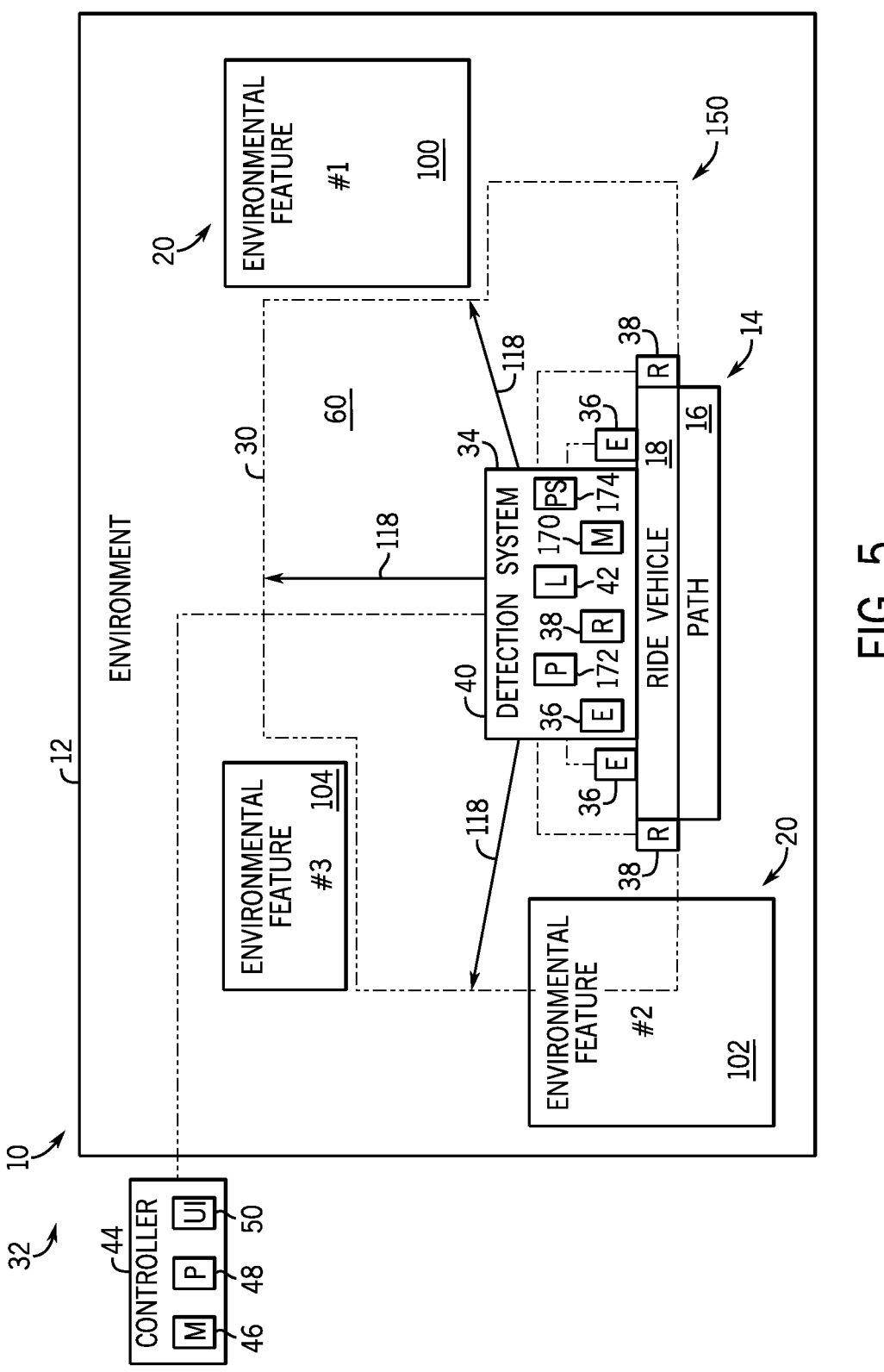
FIG. 5 is a schematic of an embodiment of an amusement park attraction, illustrating an environment of the amusement park attraction and a clearance envelope scanning system coupled to a ride vehicle, in accordance with an aspect of the present disclosure.

FIG. 5 is a schematic of an embodiment of the amusement park attraction system 10, illustrating the ride vehicle system 14 positioned within the environment 12 and the detection system 34 generating and monitoring the clearance envelope 30 to detect breaches of the clearance envelope 30. In the illustrated embodiment, the detection system 34 establishes the clearance envelope 30 having a non-uniform configuration or shape. That is, the clearance envelope 30 is defined by multiple threshold distances 118 that differ in magnitude and define the region 60 of the clearance envelope 30 having an irregular shape. In accordance with the techniques described above, the detection system 34 of FIG. 5 may determine that the first environmental feature 100 and the third environmental feature 104 do not violate the clearance envelope 30 (e.g., do not extend into the region 60) and that the second environmental feature 102 violates the clearance envelope 30 and extends into the region 60.

In the illustrated embodiment, the detection system 34 also includes emitters 36 and receivers 38 disposed external to the housing 40 of the detection system 34. As mentioned above, emitters 36 and/or receivers 38 may be coupled to the ride vehicle 18 instead of disposed within the housing 40. Such emitters 36 and/or receivers 38 may be communicatively coupled to components of the detection system 34 disposed within the housing 40 to enable operation of the detection system 34 in the manner described above. For example, emitters 36 and/or receivers 38 external to the housing 40 may be coupled to the front portion 110, the rear portion 114, and/or the side portion 116 of the ride vehicle 18. In this way, the line of sight 112 may be established between the emitters 36 and/or receivers 38 and physical objects (e.g., environmental features 20) disposed within the environment 12 in multiple directions around the ride vehicle 18.

The detection system 34 also includes additional features, which may be disposed within the housing 40 or external to the housing 40. In the illustrated embodiment, the detection system 34 includes a memory 170 and processing circuitry 172, which may be similar to the memory 46 and processing circuitry 48 discussed above. For example, the memory 170 and the processing circuitry 172 may be configured to perform similar functions as the memory 46 and processing circuitry 48 of the controller 44, such as operating the emitters 36 to output the output waves or signals 152 to establish the clearance envelope 30 and/or analyzing the reflected waves or signals 154 to determine whether the clearance envelope 30 is violated (e.g., by a physical object extending into the region 60 of the clearance envelope 30). The clearance envelope scanning system 32 may include the memory 170 and the processing circuitry 172 of the detection system 34 instead of or in addition to the memory 46 and the processing circuitry 48 of the controller 44. Thus, the detection system 34 may include a separate or integrated controller (e.g., memory 170 and processing circuitry 172) configured to evaluate the reflected waves or signals 154 detected by the receiver 38 (e.g., scanning data) to assess compliance with the clearance envelope 30 and/or the detection system 34 may transmit the scanning data to the controller 44 for evaluation of clearance envelope 30 compliance.

The detection system 34 may also include a power supply 174, which may be disposed within the housing 40 or external to the housing 40. The power supply 174 may be configured to provide power to components of the detection system 34, such as the emitters 36, receivers 38, memory 170, processing circuitry 172, communications circuitry (e.g., communicatively coupled to the controller 44), and/or other components of the detection system 34. The power supply 174 may be a battery, a capacitor, a hardwired connection (e.g., coupled to another power supply or utility power source), an electrical generator, another suitable power source, or any combination thereof.

In addition to controlling operation of the emitters 36 and receivers 38, the memory 170 and the processing circuitry 172 of the detection system 34 and/or the memory 46 and the processing circuitry 48 of the controller 44 may be configured to perform additional functions. Indeed, the detection system 34 and the controller 44 may be configured to perform any of the functions disclosed herein. As discussed above, the clearance envelope scanning system 32 (e.g., the detection system 34 and/or the controller 44) may be programmed to establish the clearance envelope 30 for one or more different embodiments of the environment 12 and/or the ride vehicle system 14. For example, a computer-aided design (CAD) drawing, model, or other data representative of an expected configuration of the attraction system 10, the environment 12, the ride vehicle system 14, and/or objects within the environment 12, such as the environmental features 20, may be programmed or stored in the detection system 34 (e.g., memory 170) and/or the controller 44. Based on the model, drawing, or data, the clearance envelope scanning system 32 may establish the clearance envelope 30 having a desired shape or configuration to determine that the environment 12 and the objects therein comply with the desired clearance envelope 30.

The detection system 34 and/or the controller 44 may also be configured to adjust one or more operating parameters of the clearance envelope scanning system 32, such as operating parameters of the emitters 36, the receivers 38, and so forth. For example, in some embodiments, the detection system 34 and/or the controller 44 may be configured to adjust a sensitivity of the clearance envelope scanning system 32 (e.g., via adjusting analysis of the reflected waves 154). The detection system 34 and/or the controller 44 may also be configured to enable calibration of the clearance envelope scanning system 32, such as for use with a particular embodiment of the attraction system 10, the environment 12, and/or the ride vehicle system 14. For example, the detection system 34 and/or the controller 44 may enable calibration of the detection system 34 to establish the clearance envelope 30 based on a position of the detection system 34 and/or components of the detection system 34 (e.g., emitters 36 and/or receivers 38) relative to the ride vehicle 18 (e.g., in a mounted configuration). In this way, the clearance envelope scanning system 32 may be configured and reconfigured for use with multiple different embodiments of the attraction system 10, the environment 12, and the ride vehicle system 14, thereby facilitating, simplifying, and improving clearance envelope validation procedures associated with amusement park attraction systems 10.

Accordingly, the techniques disclosed herein are directed to a system and method for scanning a clearance envelope of an environment of an amusement park attraction system. In particular, present embodiments are configured to scan the environment of the amusement park attraction to verify that features within the environment are positioned at a proper location relative to a ride vehicle traveling along a ride vehicle path of the amusement park attraction system and confirm that the features do not breach a clearance envelope of the ride vehicle traveling along the ride vehicle path. A clearance envelope scanning system may include a detection system configured to output waves or signals and to receive reflected waves or signals that reflect off objects within the environment. Based on analysis of the reflected waves (e.g., properties of the reflected waves), the clearance envelope scanning system may determine whether objects within the environment violate or comply with the clearance envelope established for the particular amusement park attraction system. As described herein, the clearance envelope scanning system may be a modular and programmable system that may be utilized with different amusement park attraction systems having different clearance envelopes. In this way, the present techniques enable more efficient evaluation of clearance envelope compliance for multiple amusement park attraction systems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A clearance envelope scanning system for an amusement park attraction, the clearance envelope scanning system comprising:
   a detection system configured to couple to a ride vehicle of the amusement park attraction, wherein the detection system comprises:
      an emitter configured to output a wave within an environment of the amusement park attraction; and
      a receiver configured to detect the wave reflected off of an object within the environment; and
   a controller communicatively coupled to the detection system, wherein the controller is configured to:
      receive computer-aided design (CAD) data representative of an expected configuration of the amusement park attraction;
      define a clearance envelope of the ride vehicle based on the CAD data representative of the expected configuration of the amusement park attraction and based on a position of the detection system relative to the ride vehicle;
      analyze properties of the wave detected by the receiver; and
      determine whether the object is within the clearance envelope of the ride vehicle.

2. The clearance envelope scanning system of claim 1, wherein the detection system comprises a housing configured to removably mount to the ride vehicle, and wherein the emitter and the receiver are disposed within the housing.

3. The clearance envelope scanning system of claim 2, wherein the controller is disposed within the housing.

4. The clearance envelope scanning system of claim 1, wherein the controller is configured to determine an amount by which the object extends within the clearance envelope of the ride vehicle based on analysis of the properties of the wave detected by the receiver.

5. The clearance envelope scanning system of claim 1, wherein the detection system comprises a location sensor configured to collect data indicative of a location of the detection system within the environment.

6. The clearance envelope scanning system of claim 5, wherein the controller is configured to determine a location of the object within the environment based on feedback from the location sensor.

7. The clearance envelope scanning system of claim 1, wherein the wave comprises a radio wave, an infrared wave, a light wave, an ultraviolet wave, or any combination thereof.

8. The clearance envelope scanning system of claim 1, wherein the controller is configured to define the clearance envelope based on a position of the emitter relative to the ride vehicle, based on a position of the receiver relative to the ride vehicle, or both.

9. A controller for a clearance envelope validation system of an amusement park attraction, the controller comprising a tangible, non-transitory, computer-readable medium having processor-executable instructions stored thereon that, when executed, are configured to cause processing circuitry to:
   receive computer-aided design (CAD) data representative of an expected configuration of the amusement park attraction;
   define a clearance envelope of a ride vehicle of the amusement park attraction based on the CAD data representative of the expected configuration of the amusement park attraction and based on a position of a detection system relative to the ride vehicle, wherein the detection system is mounted to the ride vehicle;
   output a control signal to the detection system to emit a wave within an environment of the amusement park attraction;
   receive an input from the detection system, wherein the input comprises data representative of a reflected wave detected by the detection system within the environment;
   analyze properties of the reflected wave; and
   determine whether an object within the environment breaches the clearance envelope of the ride vehicle based on the properties of the reflected wave.

10. The controller of claim 9, wherein the instructions, when executed, are configured to cause the processing circuitry to:
   receive additional CAD data representative of an additional expected configuration of an additional amusement park attraction; and
   define an additional clearance envelope of an additional ride vehicle based on the additional CAD data representative of the additional expected configuration of the additional amusement park attraction.

11. The controller of claim 9, wherein the instructions, when executed, are configured to cause the processing circuitry to:
   receive additional input from the detection system, wherein the additional input comprises data indicative of a first location of the detection system within the environment; and
   determine a second location of the object within the environment based on the properties of the reflected wave and based on the additional input received from the detection system.

12. The controller of claim 9, wherein the instructions, when executed, are configured to cause the processing circuitry to determine an amount by which the object within the environment extends within the clearance envelope of the ride vehicle based on the properties of the reflected wave.

13. The controller of claim 9, wherein the controller is disposed within a modular housing of the detection system, and the modular housing is removably mounted to the ride vehicle.

14. The controller of claim 9, wherein the instructions, when executed, are configured to cause the processing circuitry to define the clearance envelope based on:
   a position of an emitter of the detection system relative to the ride vehicle, wherein the emitter is configured to emit the wave,
   a position of a receiver of the detection system relative to the ride vehicle, wherein the receiver is configured to receive the reflected wave, or
   both.

15. A system for an amusement park attraction, the system comprising:

a ride vehicle comprising one or more seats, wherein each seat of the one or more seats is configured to accommodate a respective passenger of the ride vehicle, and the ride vehicle is configured to travel through an environment of the amusement park attraction along a ride vehicle path; and a clearance envelope scanning system, comprising:

a detection system configured to removably mount to the ride vehicle, wherein the detection system is configured to emit waves into the environment and outward relative to the ride vehicle and to detect the waves reflected off an object within the environment as the ride vehicle travels through the environment along the ride vehicle path; and a controller communicatively coupled to the detection system, wherein the controller is configured to:

receive computer-aided design (CAD) data representative of an expected configuration of the amusement park attraction;

define a clearance envelope of the ride vehicle based on the CAD data representative of the expected configuration of the amusement park attraction and based on a position of the detection system relative to the ride vehicle; and determine whether the object extends within the clearance envelope of the ride vehicle based on properties of the waves reflected off the object and detected by the detection system.

16. The system of claim 15, wherein:

the detection system is configured to removably mount to an additional ride vehicle configured to travel through an additional environment of an additional amusement park attraction along an additional ride vehicle path, wherein the environment and the additional environment are different from one another, and the ride vehicle path and the additional ride vehicle path are different from one another; and the controller is configured to define an additional clearance envelope of the additional ride vehicle based on additional CAD data representative of an additional expected configuration of the additional amusement park attraction.

17. The system of claim 16, wherein the controller is configured to receive the CAD data representative of the expected configuration of the amusement park attraction via a first user input, and the controller is configured to receive the additional CAD data representative of the additional expected configuration of the additional amusement park attraction via a second user input.

18. The system of claim 15, wherein the detection system comprises:

an emitter configured to emit the waves into the environment and outward relative to the ride vehicle; and a receiver configured to detect the waves reflected off the object within the environment as the ride vehicle travels through the environment along the ride vehicle path, wherein the waves comprise electromagnetic energy.

19. The system of claim 15, wherein the detection system comprises an emitter configured to emit the waves and a receiver configured to detect the waves, and the controller is configured to define the clearance envelope based on a position of the emitter relative to the ride vehicle, based on a position of the receiver relative to the ride vehicle, or both.

* * * * *